Aug. 15, 1961 W. A. GEYGER 2,996,627

MAGNETIC AMPLIFIER RELAY WITH SNAP ACTION

Filed May 17, 1960 2 Sheets-Sheet 1

INVENTOR.
WILLIAM A. GEYGER

BY W. O. Quesenberry
D. C. Hodges
ATTORNEYS

Aug. 15, 1961 W. A. GEYGER 2,996,627

MAGNETIC AMPLIFIER RELAY WITH SNAP ACTION

Filed May 17, 1960

2 Sheets-Sheet 2

INVENTOR.
WILLIAM A. GEYGER

BY W. O. Quesenberry

O. E. Hodges

ATTORNEYS.

United States Patent Office 2,996,627

Patented Aug. 15, 1961

2,996,627

MAGNETIC AMPLIFIER RELAY WITH SNAP ACTION

William A. Geyger, Takoma Park, Md., assignor to the United States of America as represented by the Secretary of the Navy Filed May 17, 1960, Ser. No. 30,036
4 Claims. (Cl. 307—88)
(Granted under Title 35, U.S. Code (1952), sec. 266)

The invention described herein may be manufactured and used by or for the Government of the United States of America for governmental purposes without the payment of any royalties thereon or therefor.

This invention relates to snap-action magnetic amplifier circuits and more particularly to magnetic amplifiers employing Zener diodes to improve the performance characteristics of such circuits.

This invention permits the use of snap-action magnetic amplifiers in situations where critical limitations had hitherto precluded the use of such devices. Magnetic amplifiers having snap-action have been generally used in switching circuits in which it was desired to furnish a desired output voltage to a circuit when a certain threshold level of signal or control current is reached. The output voltage is usually taken from a load resistor serially connected to the load or gate windings of the magnetic amplifier and the control signal is usually applied to the control windings of a magnetic amplifier. The output voltage from the conventional snap-action amplifier however will vary considerably when the signal current is increased beyond the threshold level. With the application of a Zener diode and a capacitor to the output circuit it was found that the output voltage would remain substantially constant, when the signal was increased beyond the amplitude of the threshold switching current. For example with a threshold switching signal current of 20 $\mu$a., the current would be increased to 500 $\mu$a. with a maximum output voltage increase of 5 percent.

This unique combination of a Zener diode with a snap-action magnetic amplifier as provided by this invention makes possible the entry of this device into the field of extremely low power applications. For example, the snap-action magnetic amplifier may be used to replace conventional moving coil type relays. The moving coil relay comprises a high sensitivity moving coil such as used in microammeters and galvanometers combined with contact points to convert the device into a relay type mechanism. The use of the snap-action amplifier in place of such a device permits the elimination of the highly sensitive moving coil instrument and also the elimination of contact points. The snap-action magnetic amplifier is further virtually insensitive to overloading, a feature which makes its application to the extremely low power field highly desirable.

An object of this invention is to improve the operation of snap action magnetic amplifiers with the addition of a Zener diode.

Another object of this invention is to provide a low power relay having no moving parts or contact points.

Another object of this invention is to combine a snap-action magnetic amplifier with a diode bridge and a Zener diode to provide a switching means for an external circuit.

A further object of this invention is to place a Zener diode and capacitor across the output terminals of a snap-action magnetic amplifier to provide improved output characteristics.

A still further object of this invention is to combine a Zener diode and a capacitor in a snap-action magnetic amplifier to increase the utilization of said magnetic amplifier.

Another object of this invention is to provide a snap-action magnetic amplifier switch operative in the micro-watt range of power.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
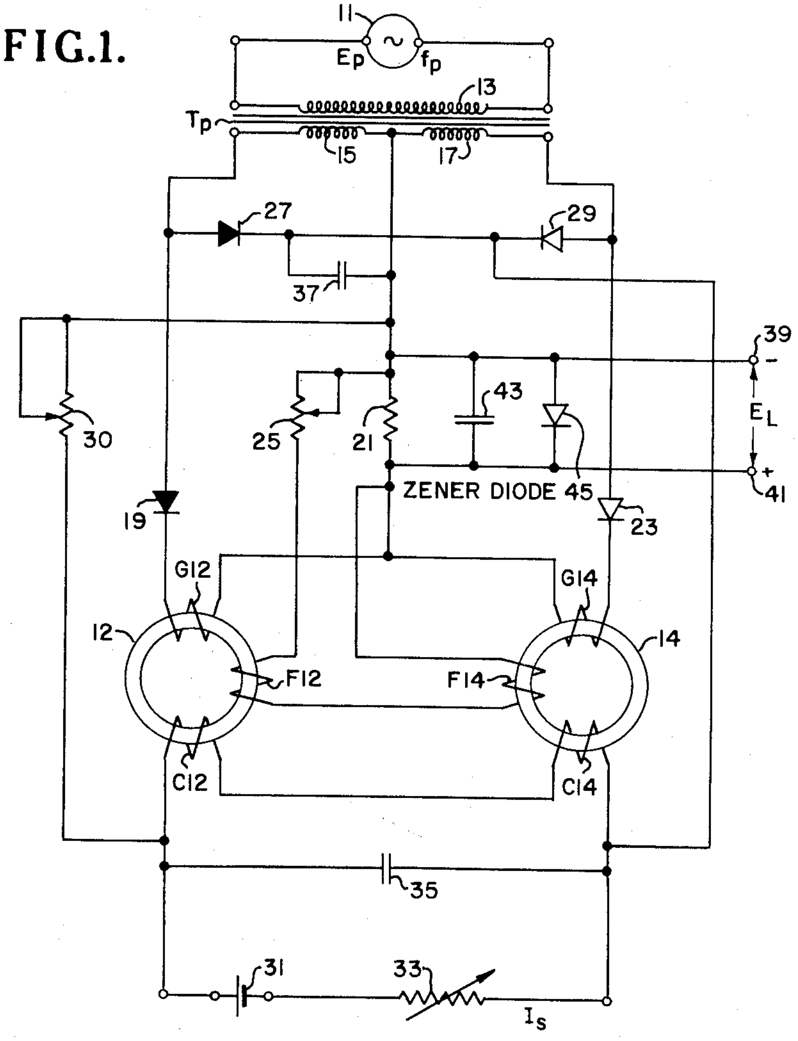
FIG. 1 is a circuit of a snap-action magnetic amplifier employing the present invention.

Referring now to FIG. 1 of the drawings, by which a circuit of one embodiment of this invention is illustrated. In this figure the magnetic amplifier is comprised of saturable cores 12 and 14. Saturable core 12 has load or gate winding G12, control winding C12, and feedback winding F12 wound thereon. Saturable core 14 has load or gate winding G14, control winding C14 and feedback winding F14 wound thereon.

Energy for the magnetic amplifier is supplied by an A.C. voltage source 11 having a voltage $E_p$ and a frequency $f_p$. Voltage source 11 connects to primary winding 13 of transformer $T_p$. The secondary winding is divided into two portions 15 and 17 with a center tap therebetween. Winding G12 of core 12 is connected to portion 15 of the secondary winding of $T_p$ through diode 19 and through load or output resistor 21, and winding G14 is connected to portion 17 of the secondary winding of $T_p$ through load resistor 21 and diode 23. Diodes 19 and 23 provide for unidirectional current flow through gate windings G12 and G14 and through load resistor 21, in accordance with the basic principle of self-saturating circuits. Feedback windings F12 and F14 are serially interconnected to variable resistor 25 and across load resistor 21 which provides a source of unidirectional voltage. Control windings are serially connected to a source of unidirectional voltage from transformer $T_p$ through diodes 27, 29 and variable resistor 30. Control windings C12 and C14 are also serially connected to a source of D.C. voltage 31 and to variable resistor 33. In operation, variable resistor 33 may be replaced by a variable D.C. input signal. A capacitor 35 serves to filter the pulsations of unidirectional voltage from transformer $T_p$. A capacitor 37 connects between the bias circuit and the load circuit to smooth the current in the bias circuit. Output terminals 39 and 41 connect across load resistor 21 and are adapted to connect to an external load. Capacitor 43 and Zener diode 45 are connected across output terminals 39 and 41 and in parallel with load resistor 21. Zener diode 45 is connected reverse to the normal current flow polarity as applied across load resistor 21. In other words, current will tend to flow through Zener diode 45 in a direction opposite the conventional current flow through a diode.

In the operation of the circuit illustrated in FIG. 1 of the drawings, Zener diode 45 will break down when a certain voltage across load resistor 21 is reached and current will flow through the diode in the reverse direction. The voltage across load 21 is controlled by the current flow through the load or gate circuit including windings G12 and G14. Current flow through the gate or load circuit is dependent upon the effective impedance of windings G12 and G14 of the gate or load circuit. The effective impedance of these windings in turn is dependent upon the saturation level of saturable cores 12 and 14. When the cores are below saturation level the windings will have effectively a high impedance, the current flow through the gate or load circuit will be small and the voltage across load resistor 21 is small and Zener diode 45 will not break down. When cores 12 and 14 are saturated by an increase in signal current $I_s$, the voltage across the load resistor 21 immediately rises to a higher value and Zener diode 45 breaks down. The output voltage is determined by the voltage sustained across the terminals of the Zener diode after breakdown. In actual practice this voltage may be about 6 volts, more or less, depending on the particular diode employed. This output voltage will remain substantially constant over a wide range of signal currents.

Figure 2:
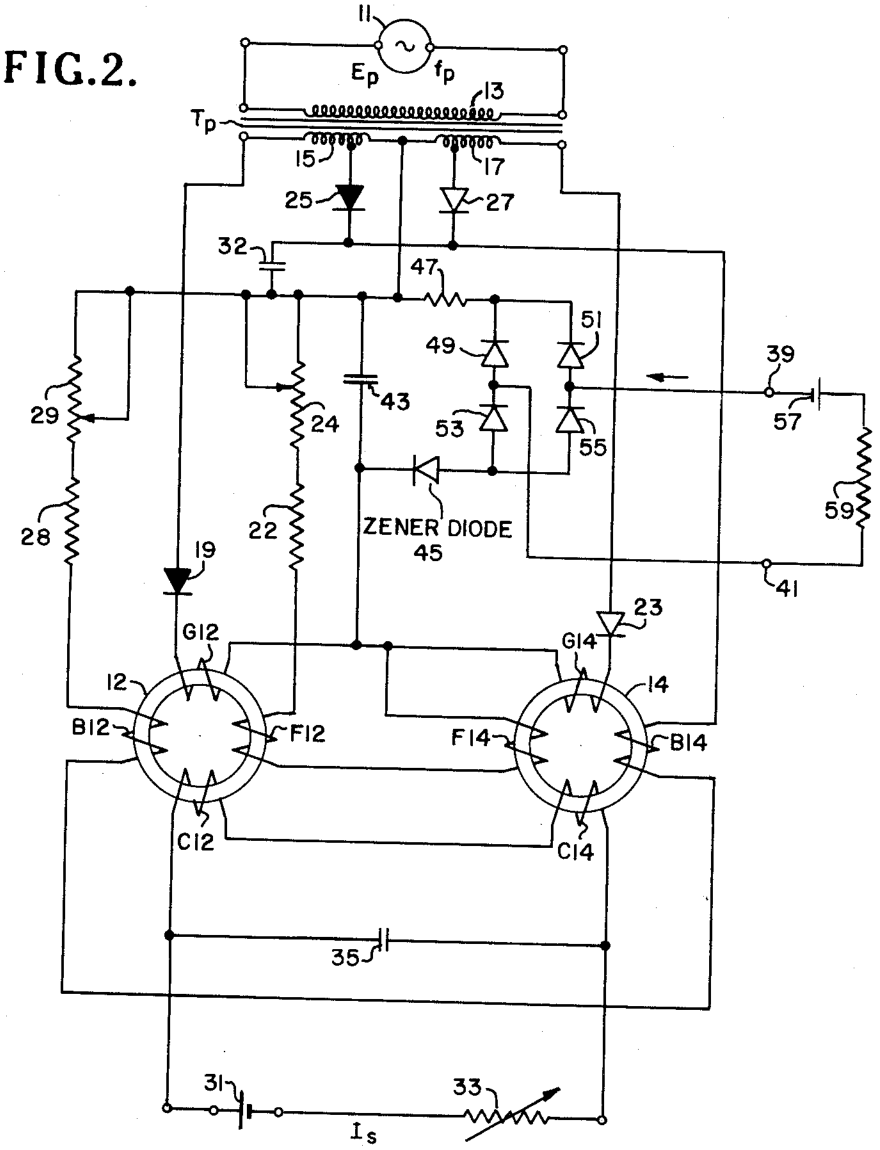
FIG. 2 is a circuit of a snap-action magnetic amplifier of the present invention employing a diode bridge.

Referring now to FIG. 2 of the drawings, a circuit of another embodiment of this invention is illustrated in which a magnetic amplifier is combined with a diode bridge and a Zener diode. Saturable cores 12 and 14 have gate or load windings G12 and G14 respectively, feedback windings F12 and F14 respectively, control windings C12 and C14 respectively, and bias windings B12 and B14 respectively. Energy is supplied to the magnetic amplifier by an A.C. voltage source 11 having a voltage $E_p$ and a frequency $f_p$. Voltage source 11 connects to primary winding 13 of transformer $T_p$. The secondary winding of transformer $T_p$ is divided into two portions 15 and 17, with a center tap between the two portions. Gate windings G12 and G14 and feedback windings F12 and F14 are connected to winding portions 15 and 17 through diodes 19 and 23 and through resistor 22 and variable resistor 24. Bias windings B12 and B14 are connected to taps on winding portions 15 and 17 and to the common center tap through diodes 25 and 27 through resistor 28 and variable resistor 29. A capacitor 32 is connected between diodes 25 and 27 to the center tap of the secondary of transformer $T_p$ in order to smooth the current flow in the bias circuit. Control windings C12 and C14 are energized by a D.C. voltage source 31 serially connected to the control windings through variable resistor 33. In practice, variable resistor 33 may be replaced by a D.C. input signal. A capacitor 35 is also connected across the control windings C12 and C14 and also across the voltage source 31 in order to provide a path for the second harmonic current induced in the control windings. A pair of output terminals 39 and 41 connect through a diode bridge and a Zener diode to the gate or load circuit of the magnetic amplifier. A capacitor 43 connects between the center tap of the secondary winding of $T_p$ and a juncture between gate windings G12 and G14. Zener diode 45 and resistor 47 serially connect with the diode bridge to complete the gate or load circuit. The diode bridge comprises diodes 49, 51, 53 and 55. An external circuit which is shown connected to output terminals 39 and 41 is comprised of a voltage source 57 and an external load 59 which is energized by voltage source 57.

In the operation of the circuit illustrated in FIG. 2 of the drawings, Zener diode 45, connected in series with the bridge circuit and in reverse polarity to the current flow direction, prevents current flow in the gate or load circuit until the voltage across the Zener diode reaches the breakdown potential. This breakdown potential is reached by increasing the current flow in the control and feed back circuits until saturation of cores 12 and 14 is reached. Current flow through the bias windings is controlled by adjustment of variable resistor 29 and current flow through feedback winding is varied by adjustment of variable resistor 24. Current flow through the control winding is regulated by adjustment of variable resistor 33. In practice, current flow through the bias and feedback windings is first adjusted to a desired value below saturation of the cores 12 and 14 such that when a D.C. input signal current $I_s$ reaches a predetermined control circuit level, cores 12 and 14 become saturated. At this point there will be a decrease in the impedance of gate windings G12 and G14 resulting in an increase in the voltage across Zener diode 45 sufficient to cause the diode to break down, permitting current flow in the gate or load circuit. Current will now flow through the diode bridge which acts as a switch to cause current flow in the external circuit, that is from voltage source 57 through external load 59. Assuming for purposes of illustration the current flow in the external circuit is in the direction indicated by the arrow, the current path will be from terminal 39 through diodes 51 and 49 and thence to terminal 41. The current path will also be from terminal 39 through diodes 55 and 53 to terminal 41. It is to be noted that the current flow through diodes 49 and 51 is apparently in the reverse direction to normal current flow through diodes. However since the current flow through the gate circuit is always much greater than the current flow in the external circuit and the current flow of the gate circuit is in the proper direction, there is no net current flow in the reverse direction through any of the diodes in the diode bridge. The current flow in the external circuit causes a reduction in the current flow through diodes 49 and 55 and an increase in current flow through diodes 51 and 53. For example, if the current flow through the gate circuit is 10 $\mu$a. the current flow through each of the diodes in the diode bridge will be 5 $\mu$a. when no current is flowing in the external circuit. If the current flow in the external circuit is 3 $\mu$a., then the current flow through diodes 49 and 55 will be 2 $\mu$a. and the current flow through diodes 51 and 53 will be 8 $\mu$a.

Figure 3:
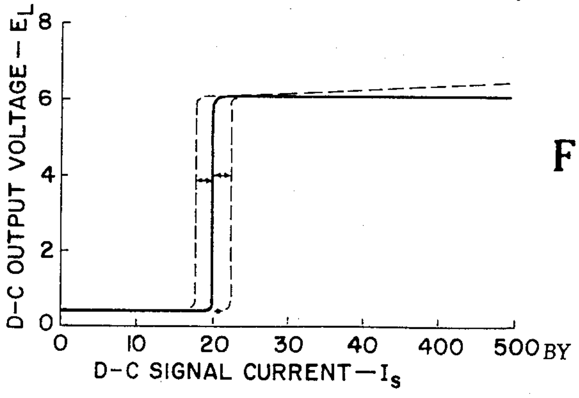
FIG. 3 is a graph illustrating the characteristics of the circuit of FIG. 1.

Referring now to FIG. 3 of the drawings a graph is shown which illustrates the characteristics of the snap-action circuit of FIG. 1. The output voltage, $E_L$, in volts, is plotted against the control signal current $I_s$, in microamperes. The solid line depicts the ideal relationship between the output voltage and the signal current and the dotted lines indicate the limits of the variations from the ideal relationship. The signal control current at the switching point may be $20\mu a.\pm 2\mu a$. The output voltage $E_L$ will remain constant at 6 volts within a variation of plus 5 percent when the control signal current is increased to $500\mu a$.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A magnetic amplifier switch comprising a saturable reactor, a load circuit coupled to said saturable reactor, a control circuit coupled to said saturable reactor, a source of D.C. control signal adapted to be applied to said control circuit to effect a control current therethrough, said load circuit including a load resistor, said load circuit being connected to a source of unidirectional voltage, said load circuit operable to produce an output voltage across said load resistor when the control current reaches a selected threshold level, a Zener diode connected across said load resistor and polarized for reverse current flow therethrough, a capacitor connected across said load resistor, said Zener diode operative to hold the output voltage constant when the current flow in said control circuit rises substantially above the threshold level.

2. A magnetic amplifier relay for selectively closing and opening an external circuit comprising a saturable reactor, a load circuit coupled to said saturable reactor, a control circuit coupled to said saturable reactor, a bias circuit coupled to said saturable reactor, a diode bridge comprising first and second parallel connected legs, said first leg having first and second serially connected diodes, said second leg having third and fourth serially connected diodes, a Zener diode, a capacitor, an external circuit having a first terminal connected to a juncture between said first and second serially connected diodes and a second terminal connected to a juncture between said third and fourth serially connected diodes, said diode bridge and said Zener diode serially connected in said load circuit to a source of unidirectional voltage, said Zener diode poled opposite to the current flow direction in said load circuit, said load circuit having zero current flow when the voltage drop across said Zener diode is less than the breakdown voltage for said Zener diode whereby said first and second terminals are electrically separated and an open circuit is effected in said external circuit, said load circuit having a current flow when the voltage drop across said Zener diode is sufficiently high to cause said Zener diode to break down whereby said first and second terminals are electrically connected and a closed circuit is effected in said external circuit causing current flow therethrough.

3. A snap-action magnetic amplifier relay comprising first and second saturable reactor cores, a control circuit coupled to each of said cores and serially connected to a source of D.C. signal voltage, a control circuit coupled to said cores and serially connected to an output load resistor and to a source of D.C. voltage, a Zener diode and a capacitor connected across said output load resistor, said Zener diode being polarized opposite to the current flow through said output load resistor, said magnetic amplifier relay operable to produce an output voltage across said output load resistor when the current flow through said control circuit caused by said D.C. signal voltage reaches a threshold level, said output voltage remaining substantially constant when the control current rises beyond said threshold level.

4. In a magnetic amplifier having a load circuit and a control circuit in which said current flow in said load circuit is regulated by the magnitude of current flow in said control circuit, a diode bridge and a Zener diode serially connected in said load circuit, an external circuit having first and second terminals connected to said bridge circuit, said Zener diode being poled opposite to the direction of current flow through said load circuit, said external circuit being effectively closed when said Zener diode breaks down thereby to cause current flow in said load circuit.

References Cited in the file of this patent

UNITED STATES PATENTS

| | | |
|---|---|---|
| 1,985,634 | Fleming | Dec. 25, 1934 |
| 2,383,492 | Klemperer | Aug. 28, 1945 |